US006836723B2

(12) United States Patent
de Silva

(10) Patent No.: US 6,836,723 B2
(45) Date of Patent: Dec. 28, 2004

(54) NAVIGATION METHOD AND SYSTEM

(75) Inventor: Andrew S. de Silva, Torrance, CA (US)

(73) Assignee: Alpine Electronics, Inc, Tokyo (JP)

( * ) Notice: Subject to any disclaimer, the term of this patent is extended or adjusted under 35 U.S.C. 154(b) by 0 days.

(21) Appl. No.: 10/307,032

(22) Filed: Nov. 29, 2002

(65) Prior Publication Data

US 2004/0107043 A1 Jun. 3, 2004

(51) Int. Cl.[7] .............................................. G01C 21/26
(52) U.S. Cl. ..................... 701/200; 701/36; 340/995.16
(58) Field of Search ................................. 701/200, 201, 701/211, 212, 36; 340/995.14, 995.15, 995.16; 307/9.1, 10.1

(56) References Cited

U.S. PATENT DOCUMENTS

| 5,239,700 | A | * | 8/1993 | Guenther et al. ........ 455/158.4 |
| 5,852,791 | A | * | 12/1998 | Sato et al. ................... 701/217 |
| 6,240,347 | B1 | | 5/2001 | Everhart et al. |
| 6,249,744 | B1 | * | 6/2001 | Morita ........................ 701/213 |
| 6,396,164 | B1 | | 5/2002 | Barnea et al. |
| 6,418,362 | B1 | * | 7/2002 | St. Pierre et al. ............. 701/36 |
| 6,476,794 | B1 | * | 11/2002 | Kataoka et al. ............. 345/161 |
| 6,525,283 | B2 | * | 2/2003 | Leng ........................... 200/339 |

* cited by examiner

Primary Examiner—Michael J. Zanelli
(74) Attorney, Agent, or Firm—Muramatsu & Associates

(57) ABSTRACT

A navigation method and system having a unique key arrangement in which a minimum number of keys is incorporated for operations of a navigation system such as map scroll or map zoom in/out. Such key arrangement is configured by three buttons and is formed on a steering wheel of a vehicle or on a panel of a portable navigation system. The key arrangement performs at least an enter key function and an up/down key function. The key arrangement changes a current status of the navigation system to either a map scroll mode or a map zoom mode and scrolls a map image in a selected direction or sets a zoom scale of the map image.

20 Claims, 14 Drawing Sheets

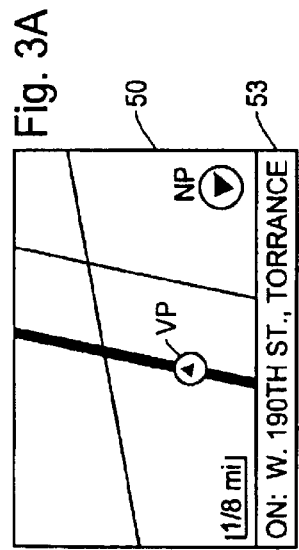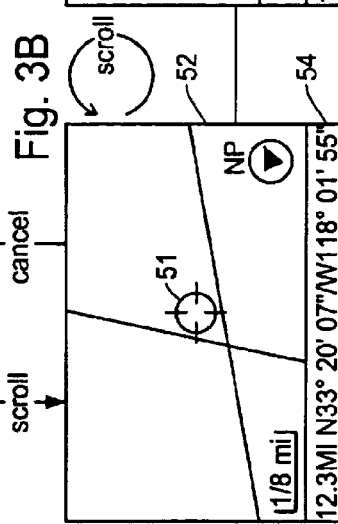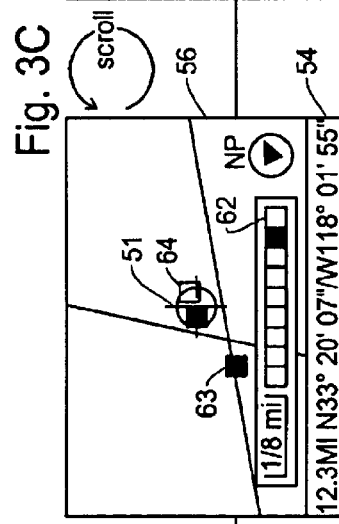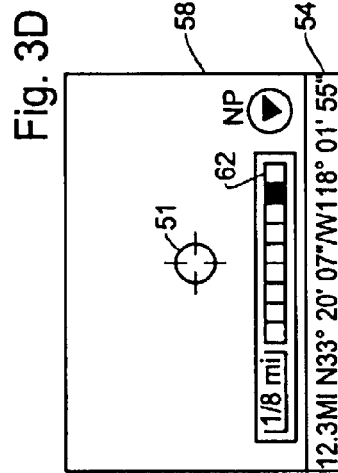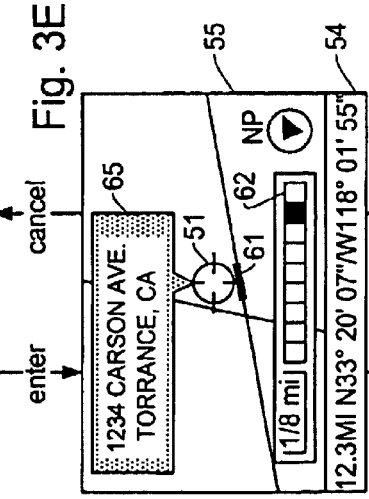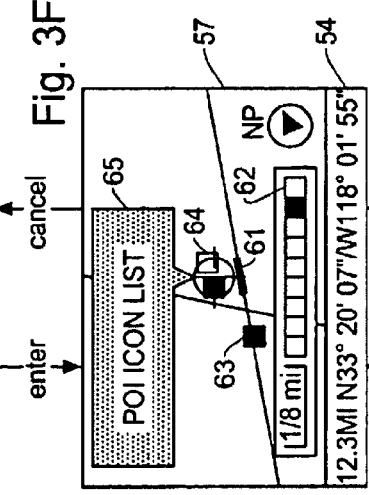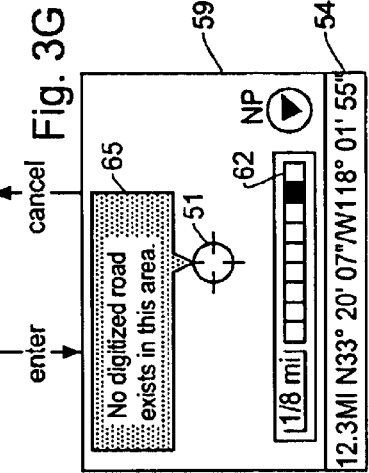

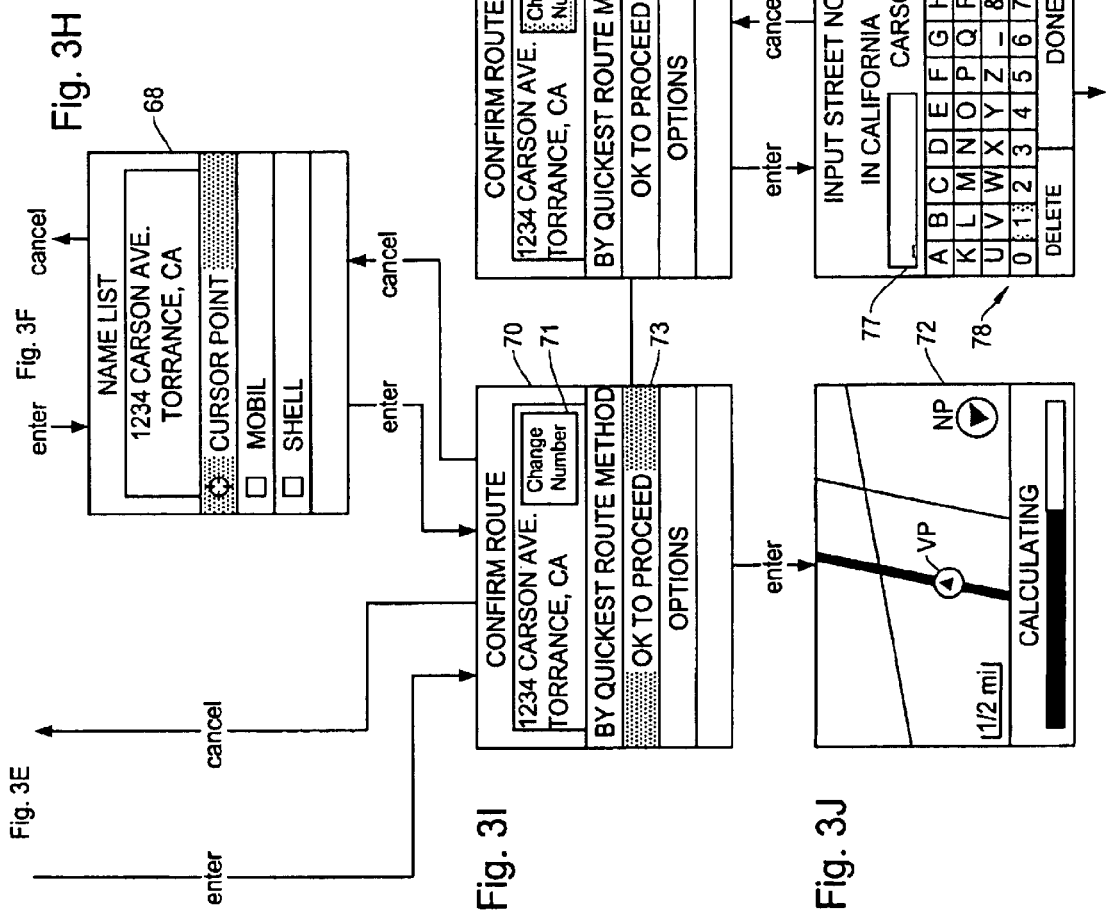

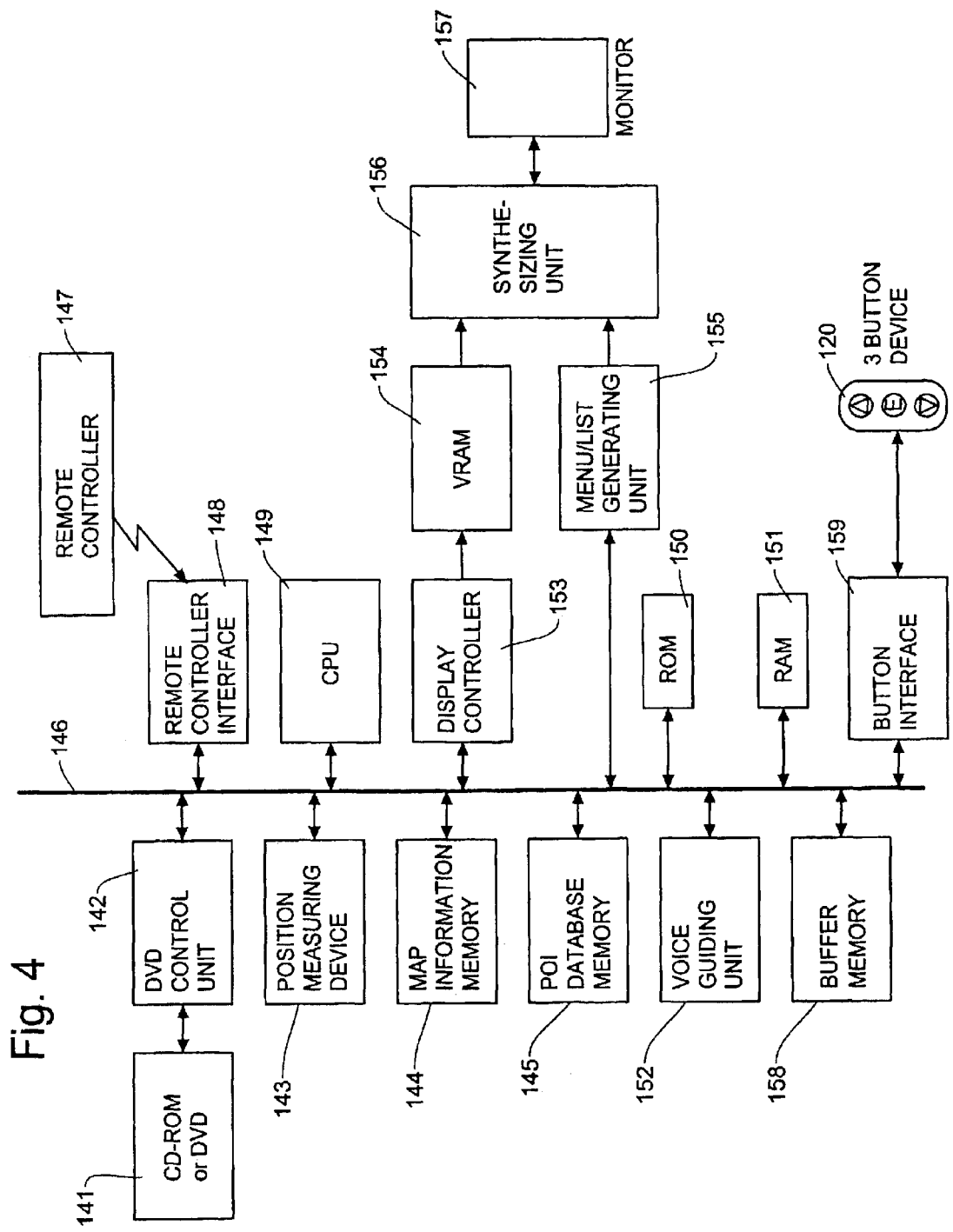

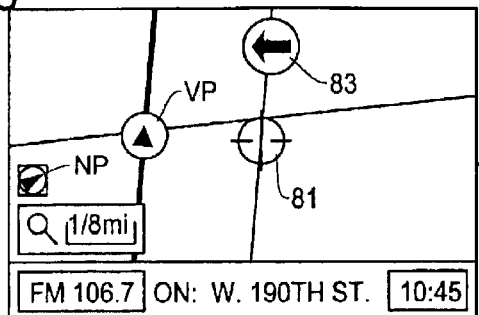
Fig. 7A
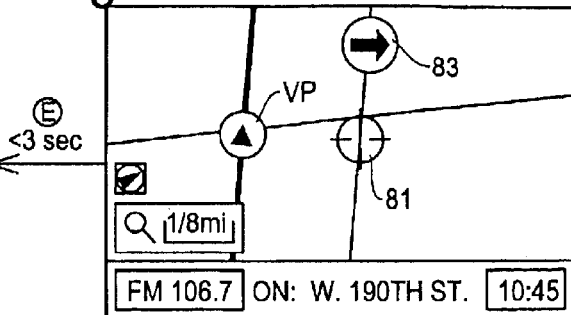
Fig. 7G
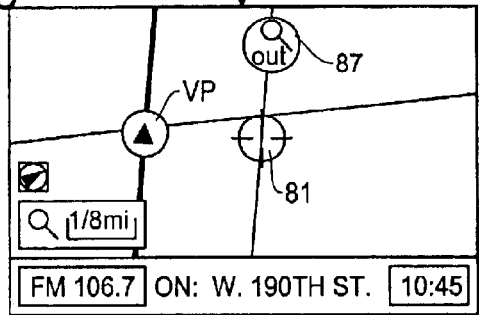
Fig. 7B
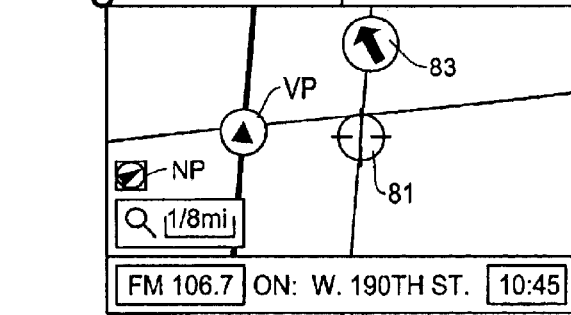
Fig. 7F
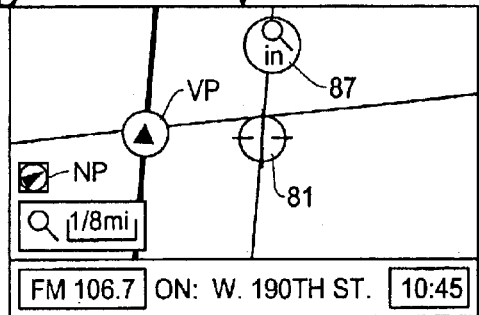
Fig. 7C
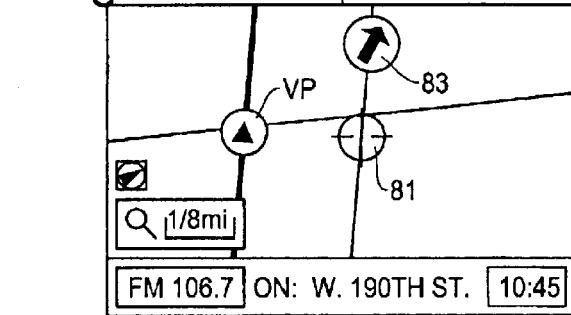
Fig. 7E
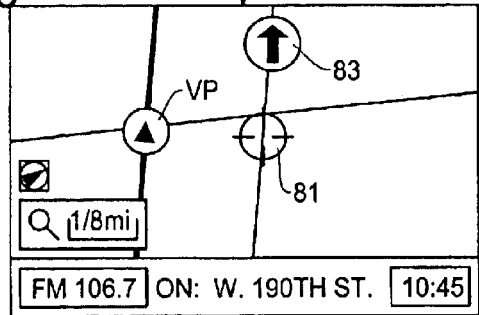
Fig. 7D
FIG. 8B

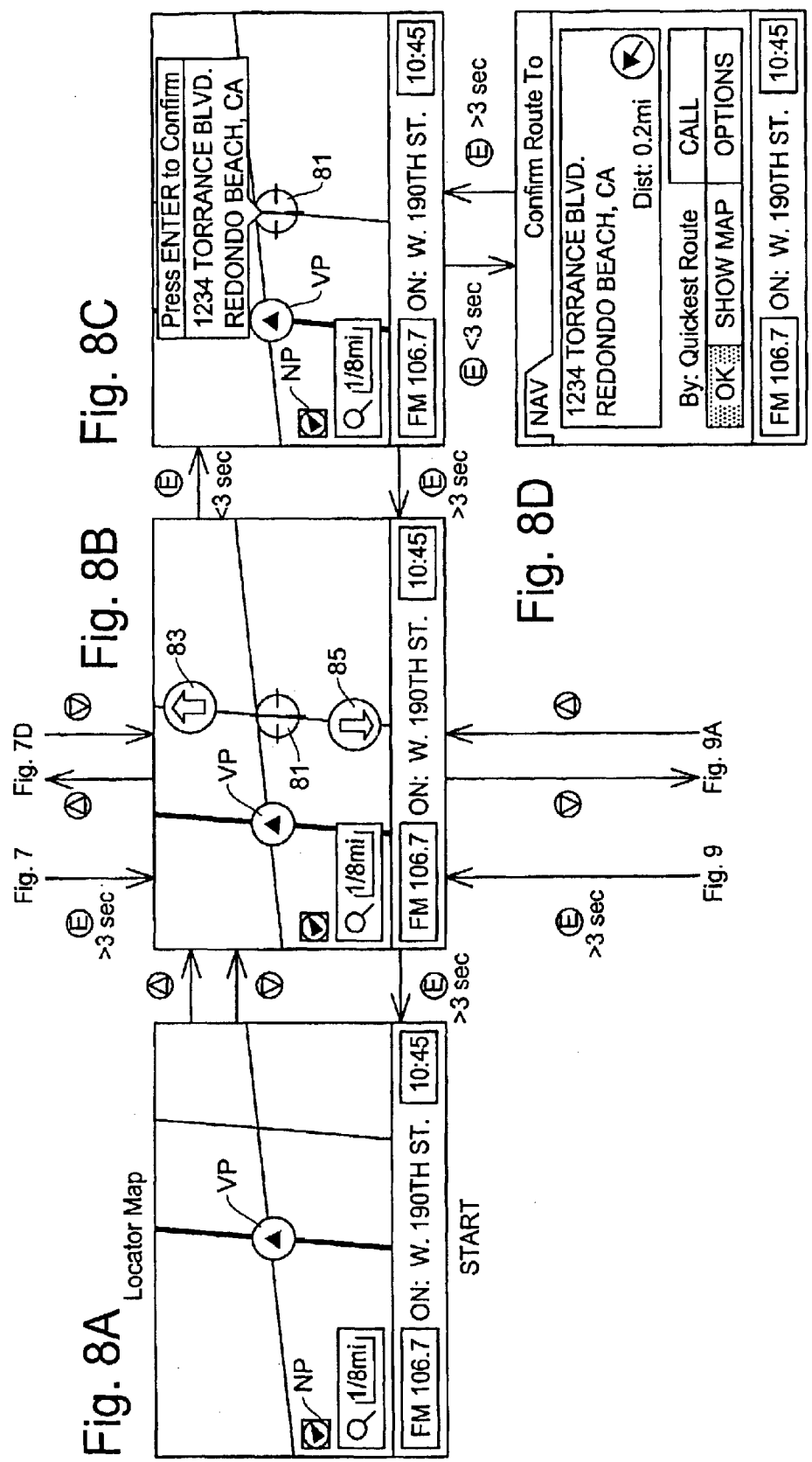

NAVIGATION METHOD AND SYSTEM

FIELD OF THE INVENTION

This invention relates to a navigation method and system for guiding a user to the destination, and more particularly, to a unique key arrangement having a minimum number of keys for operating a navigation system such as map scroll or map zoom in/out where such key arrangement is formed on a steering wheel of a vehicle or on a panel of a portable navigation system such as a one incorporated in a PDA, a lap-top computer, or a cellular phone, etc.

BACKGROUND OF THE INVENTION

A navigation system performs travel guidance for enabling a user to easily and quickly reach the selected destination. A typical example is a vehicle navigation system where the user drives the car having the navigation system. Such a navigation system detects the current position of the vehicle, reads out map data pertaining to an area at the current vehicle position from a data storage medium, for example, a CD-ROM (compact disc read-only memory), a DVD (digital versatile disc) or a hard disc the navigation system displays a map image on a monitor screen while superimposing a mark representing the current location of the user vehicle on the map image. Alternatively, such map data can be provided to the vehicle from a remote server through a communication network such as Internet.

When a destination is not set, such a navigation system functions as a locator map which indicates the current location of the vehicle on a map image. When a destination is set, the navigation system starts a route guidance function for setting a guided route from the starting point to the destination. To determine the guided route to the destination, the navigation system calculates and determines an optimum route to the destination based on various parameters. For example, the guided route is determined based on the shortest way to reach the destination, the route preferring freeways to surface roads, the least expensive way to the destination, or the route without using toll road, or the like.

Typically, the route guidance function performs an intersection guidance process in which a monitor screen displays an enlarged intersection diagram and the direction in which the vehicle is to travel while displaying the guided route on a map. During the route guidance, the navigation system reads the nodes data from the data storage medium such as DVD and successively stores the nodes data of street segments (expressed in longitude and latitude) constituting the guided route in a memory.

During actual traveling, the portion of the guided route is highlighted so as to be discriminable from other routes. When the vehicle is within a predetermined distance of an intersection it is approaching, an enlarged or highlighted intersection diagram is displayed to inform a user of the desired one of roads or directions selectable at the intersection. Such route guidance by the navigation system is also given by voice instruction.

As the present position of the vehicle changes with the travel of the vehicle, the vehicle current position mark in the map image on the screen changes accordingly, or the map is scrolled while the vehicle current position mark is fixed at a predetermined position, for example, at the center of the image. In either method, the navigation system enables the user to recognize the map information of the area at the vehicle position at a glance.

FIG. 1A shows an example of a locator map display containing a current vehicle position mark VP on a map image 21. Typically, a navigation system shows the street on which the vehicle is running in the map image 21 and a name of the street in an information box 23 on the monitor screen. Other information such as a north pointer NP, a map scale and a current time may also be illustrated on the display screen. In this manner, the locator map display shows the current position of the vehicle on the map image, however, it does not perform the route guidance function because the destination is not set.

FIG. 1B shows an example of route guidance display which performs the route guidance function. The route guidance display is activated after specifying the destination. In this example, the current street "W 190TH ST" and the left side of the next street "PRAIRIE AVE" will be highlighted in the map image 21 to show the direction of turn at the next intersection. In addition, this example further shows an arrow indicating the direction (left) in which the vehicle is to turn at the intersection in a guidance information box 22 at the top of the screen. The guidance information box 22 also shows the name of the street which intersects with the current street and a distance to the intersection. Thus, in this example, the navigation system indicates that the vehicle should make a left turn at the intersection.

Further to the highlighted display, such route guidance is accompanied by voice instructions. If the direction of travel in the next intersection is left, the navigation system gives spoken guidance such as "turn left at the next intersection". In this example, an information box 24 at the bottom of the display screen includes information regarding the remaining distance to the final destination and an estimated time to reach the final destination.

As noted above, in order to be guided by the route guidance mode such as shown in FIG. 1B, a destination must be specified in the navigation system so that the system can find one or more routes to get to the destination. FIGS. 2A–2C show examples of display on the monitor screen during the operation of inputting the destination.

By operating a menu key, a main menu screen 25 such as shown in FIG. 2A is displayed on the navigation system and a menu item "Destination" is selected from the main menu. This allows the navigation system to display an "Enter Destination by" screen 27 as shown in FIG. 2B for specifying an input method for selecting the destination. The "Enter Destination by" screen 27 lists various methods for selecting the destination including "Address" for specifying the city and address of the destination, "Intersection" for specifying the names of two streets which intersect with one another, and "Point of Interest" (POI) for selecting the programmed destination based on the name, category or telephone number. Other methods in the "Enter Destination by" screen 27 include "Recent Route" for specifying the destination based on the recent destinations saved in the navigation system, "Address Book" for selecting the address of the destination out of the addresses stored in the system, and "Today's Plan" for specifying two or more destinations in the navigation system.

When selecting, for example, the "Address" in FIG. 2B, the navigation system displays an "Enter Street Name" screen such as shown in FIG. 2C. The screen of FIG. 2C is basically a key board 38 for inputting the city and address in an address input box 37 on the monitor screen. After inputting the destination, the navigation system determines a route to the destination based on, for example, the shortest way to reach the destination, the route using many freeways as possible, the route without using toll road, or the like.

Thus, the navigation system moves to the route guidance display such as shown in FIG. 1B which performs the route guidance.

In such a navigation system, in addition to the operation described with reference to FIGS. 2A–2C, a map scroll function and a map zoom function are frequently used. An example of operation involved in the map scroll is shown in FIGS. 3A–3L. This example shows a process in which a user finds and specifies a destination from a map screen by selecting the street name, since there arises a case where the user is familiar with a particular city and knows a particular address in that city where he wants to go. In such a situation, for entering the destination, the user may prefer to use a map screen 50 of FIG. 3A rather than a key board screen of FIG. 2C.

The user sets the map image of the city "Torrance, Calif." with use of, for example, a zoom function of the navigation system. The user scrolls the map display on a scroll screen 52 as shown in FIG. 3B in which a cursor (marker) 51 is displayed at about a center of the screen. An information box 54 in the lower part of the screen shows the cursor position such as in latitude and longitude. When the user finds a particular street which goes to the particular destination, he adjusts the map image so that the cursor 51 specifies the street image.

Then, the user presses the enter key, which changes the navigation system to a screen which shows an address of the selected street. In this example, by pressing the enter key, the navigation system moves to the screen 55 on which a balloon message 65 is displayed as shown in FIG. 3E. The balloon message shows an address of the street specified by the cursor point 61. The screen 55 also shows a zoom scale 62 since the zoom function is used for pointing the cursor 51 on the street image. If the street name in the balloon message 65 is correct, the user presses the enter key, which brings the navigation system to a route confirmation screen 70 of FIG. 3I.

FIG. 3C shows the situation where the navigation system displays pre-established POI icons 63 and 64 on a screen 56. Such POI icons include a restaurant icon, gas station icon, and the like. When the cursor 51 points at least one POI icon on the screen 56 of FIG. 3C, and the user presses the enter key, the navigation system displays a balloon message 65 which reads "POI Icon List" in FIG. 3F. The user presses the enter key, which brings the FIG. 3H which lists the names of the places designated by the POI icons. By selecting the "Cursor Point" in the name list, the screen 68 displays the street address "1234 Carson Ave., Torrance, Calif." at the cursor point 61, which is the same as that shown in FIG. 3E. Thus, by hitting the enter key, the navigation system moves to the route confirmation screen of FIG. 3I.

FIG. 3D shows a situation where the display image of FIG. 3C is scrolled and the cursor 51 is in an area where no POI icon or street exists. Thus, the screen 58 shows only the cursor 51 at the center. If the user presses the enter key in FIG. 3D, the navigation system displays a screen 59 including a balloon message 65 which reads, for example "No Digitized Road Exists in This Area" as shown in FIG. 3G. Therefore, the user has to return to the prior screens such as shown in FIGS. 3B or 3C to find the particular street of his destination.

Referring back to FIG. 3I, the confirmation route screen 70 shows the address at the cursor point 61 in FIG. 3E or FIG. 3F. This screen is to confirm the destination before proceeding to the route calculation process. In the case where the user selects an "OK to Proceed" menu on the confirmation screen 70 and presses the enter key, the navigation system moves to the route calculation process shown in FIG. 3J. After determining the appropriate route to the destination, the navigation system displays the route guidance screen such as shown in FIG. 1B.

In this particular example, the route confirmation screen 70 in FIG. 3I includes a "Change Number" menu 71. When the user wants to change only the street number, the "Change Number" menu 71 is used to change the street number for the street specified through the map image in the foregoing. FIG. 3K shows a situation where the "Change Number" menu is selected by the user. Then, the user hits the enter key, which brings the navigation system to a key board screen 76 of FIG. 3L showing a key board 78 which is designed to input only the street number in a street number box 77. Although not shown, by specifying the street number in FIG. 3L, the navigation system goes to the confirmation route screen of FIG. 3I and the route calculation process of FIG. 3J, thereby performing the route guidance.

As described above, the operation of the navigation system involves frequent use of assigned keys such as selection (enter) keys, cursor keys, map scroll keys and map zoom keys. It is desired that the number of such keys be small so that the user needs not to know each function of the keys. Especially, when the navigation system is used in a vehicle, it is desired that the number of keys is small as well as a position of such keys is close enough to a user (driver). It is ideal that the keys for operation of the navigation system are mounted on a steering wheel so that the driver can operate the navigation system without releasing the hands from the steering wheel.

SUMMARY OF THE INVENTION

It is, therefore, an object of the present invention to provide a navigation method and apparatus in which a unique key arrangement having a minimum number of keys is provided for operating a navigation system, thereby simplifying an overall operation procedure of the navigation system.

It is another object of the present invention to provide a unique key arrangement having a minimum number of keys for scrolling or zooming a road map or otherwise operating a navigation system.

It is a further object of the present invention to provide a unique key arrangement having three buttons mounted on a vehicle steering wheel or on a portable navigation system for scrolling or zooming a map image or controlling other operations of the navigation system.

The present invention is directed to a navigation method and system having a unique arrangement of keys or buttons for operating a navigation system such as selecting menus, map scrolling, map zooming, etc. Such a navigation system is typically implemented in a vehicle although other implementation such as a portable navigation system, a one incorporated in a PDA or a cellular phone, etc. is also possible. When the key arrangement of the present invention is implemented in a vehicle, it is preferable that such a key arrangement is configured by three buttons mounted close to one another on a steering wheel, thereby promoting easy operation and safe driving.

FIGS. 2A–2C are schematic diagrams showing display examples of a navigation system. FIG. 2A is a main menu, FIG. 2B is a destination set menu, and FIG. 2C shows a keyboard display for entering a specific address.

In one aspect of the present invention, the navigation system for guiding a user to a destination includes a key arrangement which performs at least an enter key function and an up/down key function. The key arrangement changes a current status of the navigation system to a map scroll mode or a map zoom mode and scrolls a map image in a selected direction or sets a zoom scale of the map image. The key arrangement is mounted on a steering wheel of a vehicle or a panel of a portable navigation system.

Another aspect of the present invention is a navigation method. The method includes the steps of changing a current status of the navigation system to a map scroll mode or a map zoom mode by pressing either an up key or a down key, changing and selecting a map scroll direction or a map zoom-in or zoom-out mode sequentially on a screen of the navigation system by pressing an enter key, adjusting an amount of map scroll in the selected map scroll direction or a map zoom scale in the selected map zoom-in or zoom-out mode by pressing either the up key or the down key, and returning to an operation mode of the navigation system other than the map scroll mode or the map zoom mode.

According to the present invention, the unique key arrangement has the minimum number of keys for operating the navigation system, thereby simplifying the overall operation procedure of the navigation system. Thus, the user needs to use only such a small number of keys for the map scrolling and map zooming. Especially, when the navigation system is used in a vehicle, the key arrangement of the present invention is advantageous since the key arrangement can be mounted on the steering wheel so that the position of the keys is close enough to the user. Thus, the user can operate the navigation system while holding steering wheel, thereby promoting the safe driving.

BRIEF DESCRIPTION OF THE DRAWINGS

FIG. 2A is a main menu, FIG. 2B is a destination set menu, and FIG. 2C shows a keyboard display for entering a specific address.

FIGS. 3A–3L are schematic diagrams showing an example of operation involved in the map scroll function of the navigation system for finding a street name and specifying a destination through the map screen.

FIG. 4 is a block diagram showing an example of structure in the navigation system for implementing the key arrangement of the present invention.

FIGS. 7A–7G are schematic diagrams showing examples of navigation screen where map scroll directions or map zoom in/out are specified in response to an operation of an enter key when an up key is pressed in advance.

FIGS. 8A–8D are schematic diagrams showing examples of navigation screen involving a process for scrolling a map, selecting a destination and confirming the destination before starting a route guidance mode.

DETAILED DESCRIPTION OF THE INVENTION

Figure 1A:
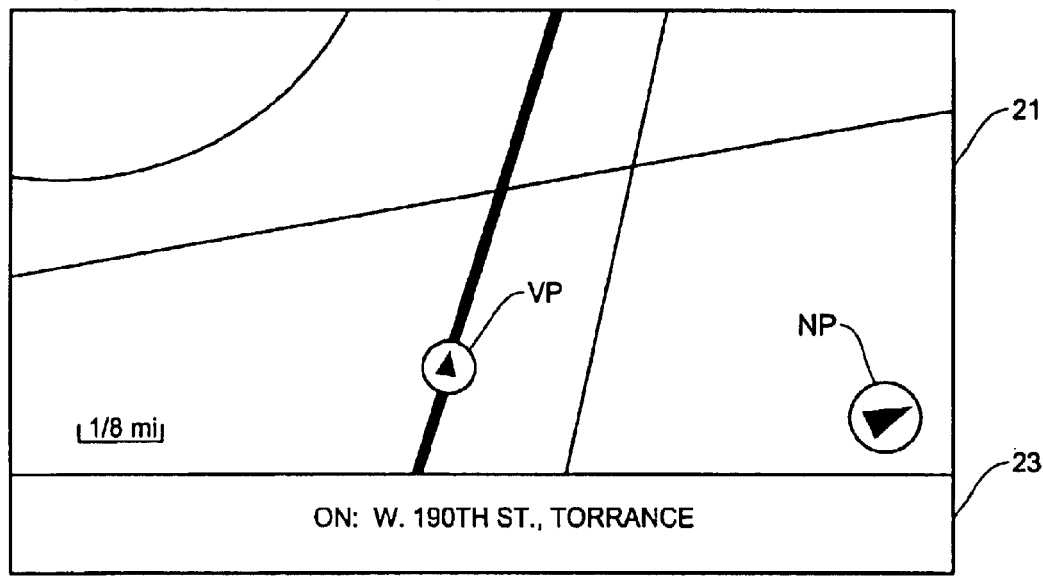
FIGS. 1A and 1B are schematic diagrams showing an example of locator map display and route guidance display, respectively, of a navigation system.
Figure 1B:
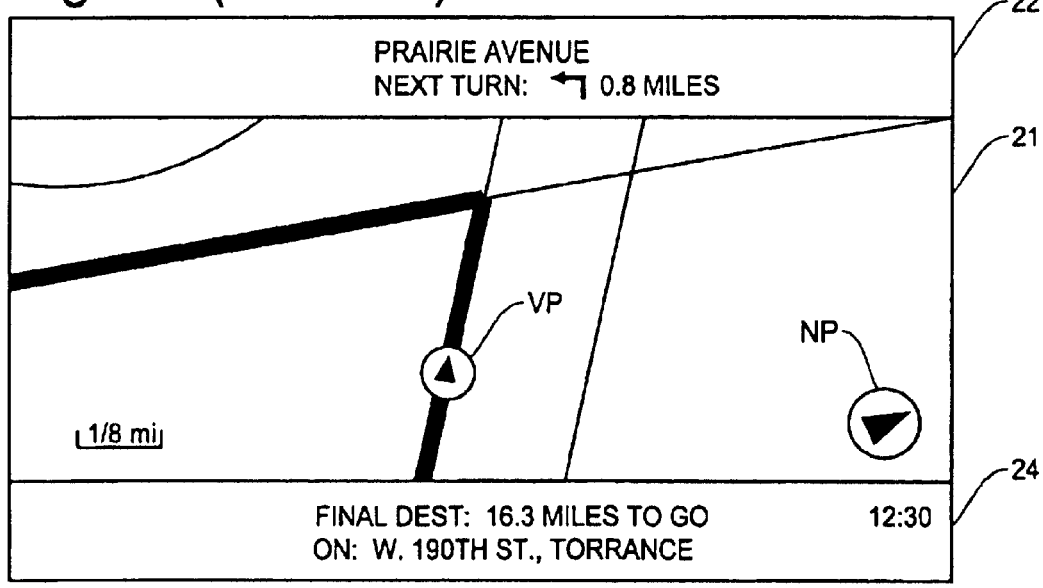
Figure 2A:
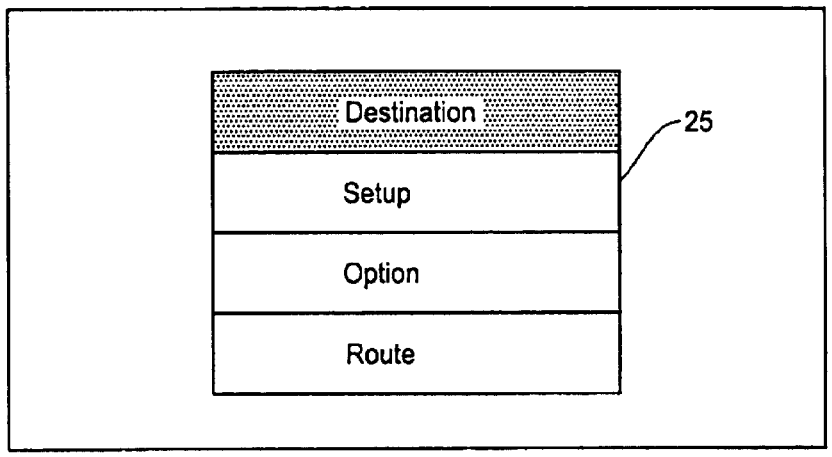
FIGS. 2A–2C are achematic diagrams showing display examples of a navigation system.
Figure 2B:
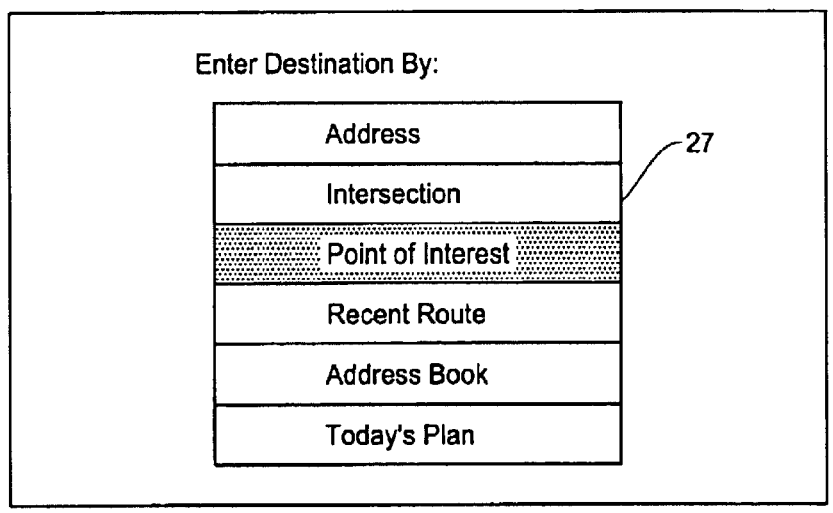
Figure 2C:
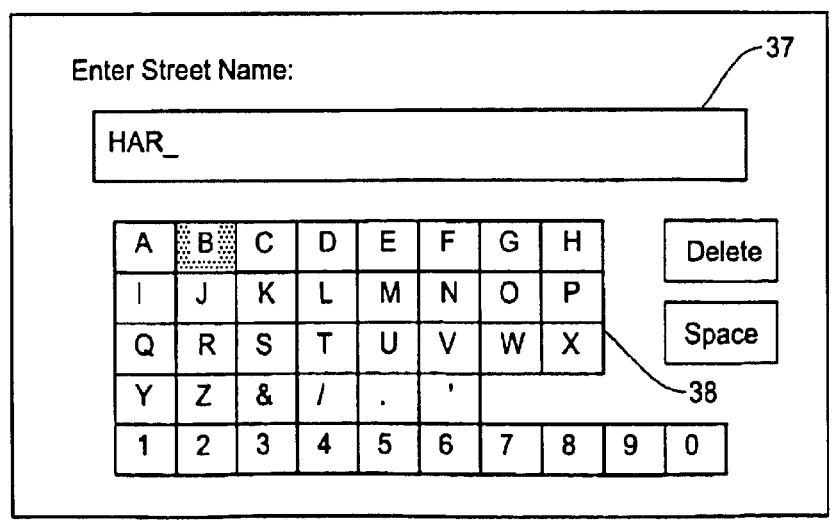

The present invention will now be described in more detail with reference to the accompanying drawings. In the present invention, the minimum number of keys is arranged for operating the navigation system. In the preferred embodiment, the key arrangement includes three keys (buttons), i.e., an up key (up button), a down key (down button) and an enter/cancel key (enter/cancel button). This means that the key arrangement is configured by two direction keys (such as up-down, right-left, forward-backward, or the like) and one enter/cancel key. Thus, although the words "up key" and "down key" are used in the specification and claims, this means—one direction key—and—another direction key—, and should not be limited to literal meanings of the words. Further in the present invention, the words "key" and "button" are used interchangeably.

When the navigation system is installed in a vehicle, such a key arrangement (for example, "three button device") is mounted on a predetermined position of a steering wheel so that a user (such as a driver) is able to press the keys (buttons) while holding the steering wheel. The key arrangement of the present invention is advantageously applicable to a vehicle navigation system. However, the key arrangement of the present invention can also be applicable to any navigation system established on a portable terminal device, such as a hand-held navigator, a lap-top computer, a PDA, a cellular phone, and the like. In such an application, the key arrangement will be established on a panel of the portable terminal device.

In the following, for the purpose of illustration, the key arrangement of the present invention will be described mainly for the case where it is implemented in the vehicle navigation system. FIG. 4 is a block diagram showing an example of structure of the vehicle navigation system. The navigation system includes a map storage medium 141 such as a CD-ROM, DVD, hard disc or other storage means (hereafter "DVD") for storing map information. The block diagram also includes a DVD control unit 142 for controlling an operation for reading the map information from the DVD, a position measuring device 143 for measuring the present vehicle position. As an example, the position measuring device 143 has a vehicle speed sensor for detecting a moving distance based on speed pulses, a gyroscope for detecting a moving direction, a microprocessor for calculating a position and direction, a GPS receiver for determining a current position of the vehicle based on signals from GPS satellites, etc.

The block diagram of FIG. 4 further includes a map information memory 144 for storing the map information which is read out from the DVD 141, a database memory 145 for storing point of interest (POI) information, etc. read out from the DVD 141, a remote controller 147 for executing a menu selection operation, an enlarge/reduce operation, a destination input operation, etc. and a remote controller interface 148.

In addition to the remote controller 147, the navigation system includes various other input methods to achieve the same and similar operations done through the remote controller. For example, a navigation system may include hard keys and a joystick on a head unit of the navigation system mounted on a dash board, touch screen of the display panel, and voice communication means. According to the key arrangement of the present invention, a three button device 120 is connected to the navigation system through a button interface 159. Typically, the three button device 120 is mounted on a steering wheel of the vehicle.

In the block diagram of FIG. 4, the navigation system further includes a bus 146 for interfacing the above units in the system, a processor (CPU) 149 for controlling an overall operation of the navigation system, a ROM 150 for storing various control programs such as a route search program and a map matching program necessary for navigation control, a RAM 151 for storing a processing result such as a guided route, a buffer memory 158 for temporarily storing data for promoting specific functions such as data sorting, a voice interface and guiding unit 152 for voice communication interface and spoken instructions, a display controller 153 for generating map images (a map guide image and an arrow guide image) on the basis of the map information, a VRAM 154 for storing the images generated by the display controller, a menu/list generating unit 155 for generating menu image/various list images, a synthesizing unit 156 for synthesizing images from the VRAM 154 and the menu/list generating unit 155, and a monitor (display) 157.

Figure 5:
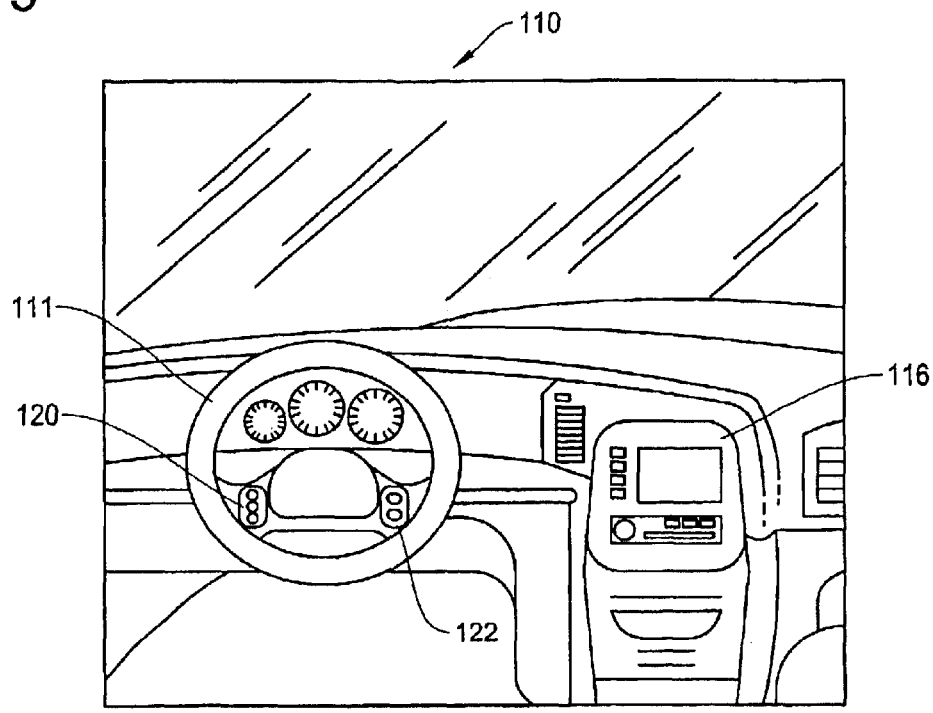
FIG. 5 is a schematic diagram showing an example where the key arrangement of the present invention is implemented on a vehicle steering wheel for operating a navigation system in the vehicle.

FIG. 5 shows an example of key arrangement (three button device) 120 established in a vehicle 110 on a steering wheel 111. With use of the three button device 120, a user (driver) can control the navigation system 116 without releasing his hand from the steering wheel 111. In the case where the three button device is desired to use in other function of the vehicle, such as for controlling an audio system, another key device 122 may also be incorporated in the vehicle 110 for changing the functions of the three button device 120 between the navigation system and the audio system.

Figure 6A:
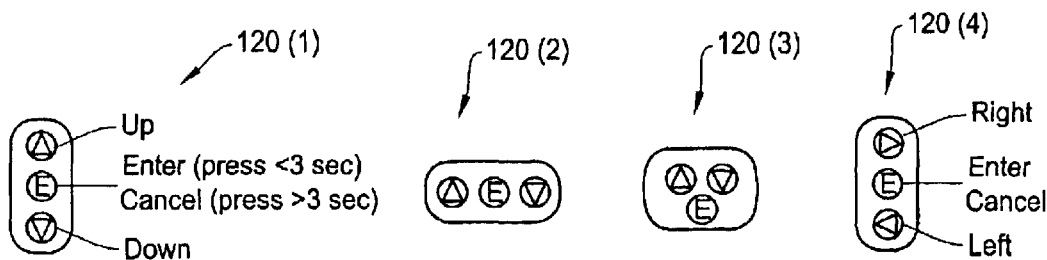
FIGS. 6A and 6B are diagrams showing examples of three button structure in the key arrangement of the present invention and examples of icon displayed on the navigation screen in response to the operation of the buttons.

FIG. 6A shows examples of key arrangement, i.e., the three button device 120 in the present invention. In all of the examples, an enter/cancel key is preferably located between an up key and a down key, although the present invention is not limited to such an arrangement. In the three button device 120(1), an up key, an enter (cancel) key and a down key are vertically aligned in a straight line. In the three button device 120(2), an up key, an enter (cancel) key and a down key are horizontally aligned in a straight line. It is also possible to align the three buttons in a diagonal direction. In the three button device 120(3), an up key, an enter (cancel) key and a down key are aligned in a triangle fashion or a reverse triangle fashion. The keys in the three button device 120(4) are aligned in a manner similar to the device 120(1), however, the up-down keys are actually right/left keys.

As noted above, the words "up key" and "down key" are used in the specification and claims for simplicity of illustration. The "up key" and "down key" respectively mean—one direction key—and—another direction key—. Thus, the "up key" also means—right key—, —forward key—, or the like, and the "down key" also means—left key—, —backward key—, or the like, thus should not be limited to literal meanings of the words.

As will be described more specifically later, the enter/cancel key performs an "Enter" function when it is pressed less than a predetermined time length such as three (3) seconds. Conversely, the enter/cancel key performs a "Cancel" function when it is pressed longer than the predetermined time length. The up key and the down key are used to select an initial scroll direction as well as to control the amount of map scroll or zoom scale, which will also be explained in detail later.

Figure 6B:
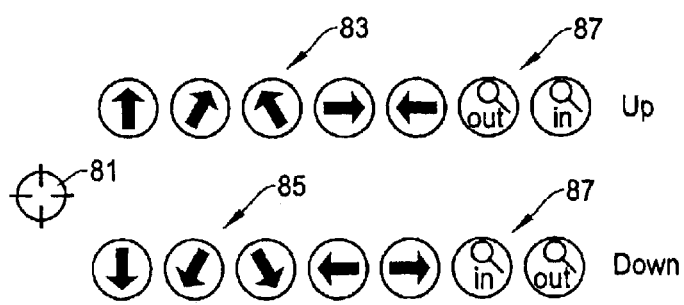

FIG. 6B shows groups of icons and functions of the up key (up button) and the down key (down button) in the key arrangement of the present invention. The upper part of FIG. 6B shows a group of icons 83 each indicating a direction of map scroll and map zoom icons 87 indicating either a map zoom-in or zoom-out mode. After pressing the up key, one of the five icons 83 and two icons 87 is displayed on the navigation system screen in the predetermined order at each operation of the enter key. Thus, when the icon indicating the desired map scroll direction or map zoom in/out is displayed, the user operates the up key to scroll the map in that direction or to change the map scale (map zoom-in or map zoom-out). The details of these functions will be described later with reference to FIGS. 7A–7G.

The lower part of FIG. 6B shows a group of icons 85 each indicating a direction of map scroll and map zoom icons 87 indicating either a map zoom-in or zoom-out mode. After pressing the down key, one of the five icons 83 and two icons 87 is displayed on the navigation system screen in the predetermined order at each operation of the enter key. Thus, when the icon indicating the desired map scroll direction or map zoom in/out is displayed, the user operates the down key to scroll the map in that direction or to change the map scale (map zoom-in or map zoom-out). The details of these functions will be described later with reference to FIGS. 9A–9G.

A cursor 81 is displayed on the map screen in the map scroll or map zoom operations related to either upper icons or lower icons of FIG. 6B. The cursor 81 is also displayed when performing other functions such as shown in FIGS. 8A–8D for searching and selecting a destination from the map screen. The switching between the map scroll (map zoom) and the functions of FIGS. 8A–8D will be made, for example, by pressing the enter key for longer than the predetermined time length such as three (3) seconds, i.e., "Cancel" the current status or function.

FIGS. 7A–7G show display examples of the navigation system which are sequentially changed by pressing the enter key after pressing the up key. These examples correspond to the group of icons shown in the upper part of FIG. 6B to provide the selection mode for specifying the map scroll directions and map zoom in/out mode. Namely, in the case where the user wants to scroll the map generally in upward directions, the user first presses the up key (up button). Then the navigation system shows different icons in a sequential order every time when the enter key is pressed as shown in FIGS. 7A–7G each indicating a map scroll direction or a zoom in/out mode.

Figure 14A:
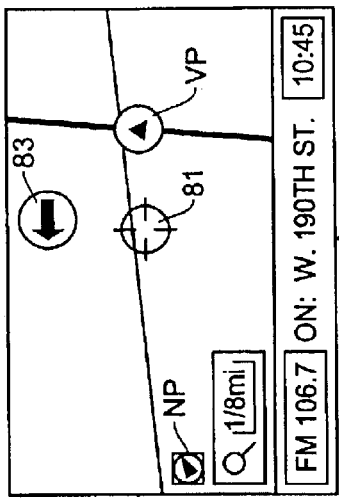
FIGS. 14A and 14B are schematic diagrams of the navigation screen showing map scroll operations where the map is scrolled from FIG. 14B to FIG. 14A by the up key after setting the scroll direction in FIG. 7A.
Figure 14B:
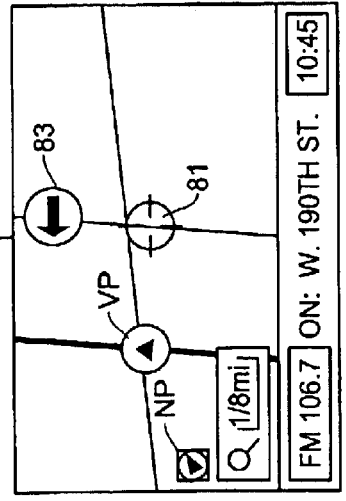

FIGS. 7A and 7D–7G show various map scroll directions which are switched by pressing the enter key in less than a predetermined time length such as three seconds. For example, in FIG. 7G, the map scroll direction is "right" as shown by the icon 83. By pressing the enter key for less than three seconds, the navigation screen is changed to FIG. 7A where the map scroll direction becomes "left" as shown by the icon 83. In this situation, if the user presses the up key again, the map image on the screen is scrolled toward the left as shown in FIGS. 14A and 14B.

Figure 10A:
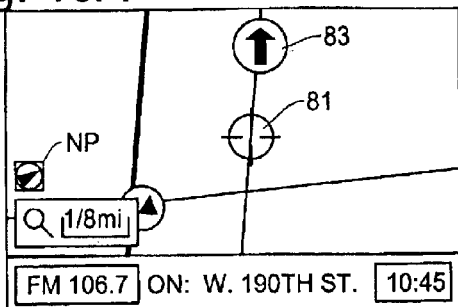
FIGS. 10A and 10B are schematic diagrams of the navigation screen showing map scroll operations where the map is scrolled from FIG. 10B to FIG. 10A by the up key after setting the scroll direction in FIG. 7D.
Figure 11A:
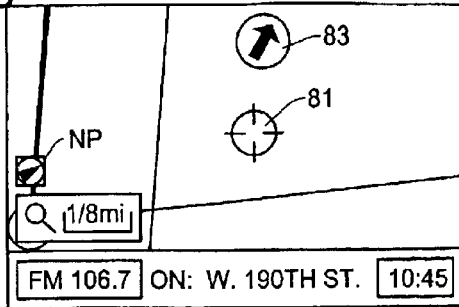
FIGS. 11A and 11B are schematic diagrams of the navigation screen showing map scroll operations where the map is scrolled from FIG. 11B to FIG. 11A by the up key after setting the scroll direction in FIG. 7E.
Figure 10B:
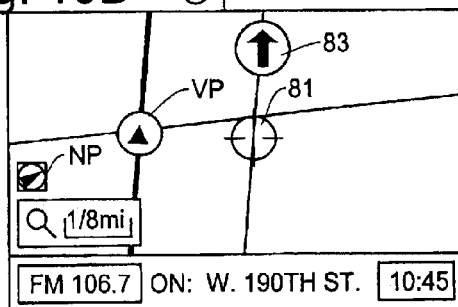
Figure 11B:
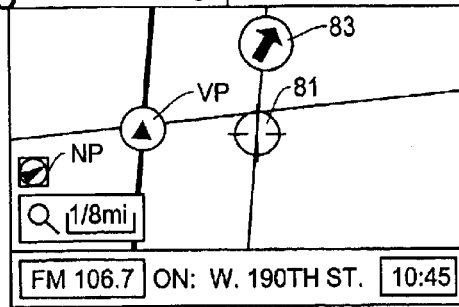

In the example of FIG. 7D, the map scroll direction is "up" as shown by the icon 83 which is produced by pressing the enter key in a zoom-in mode of FIG. 7C. In this situation, if the user presses the up key, the map image on the screen is scrolled in the upward direction as shown in FIGS. 10A and 10B. In the example of FIG. 7E, the map scroll direction is "upper right" as shown by the icon 83 which is produced by pressing the enter key for less than the predetermined time in the condition of FIG. 7D. In this situation, if the user presses the up key, the map image on the screen is scrolled in the upper right direction as shown in FIGS. 11A and 11B.

Figure 12A:
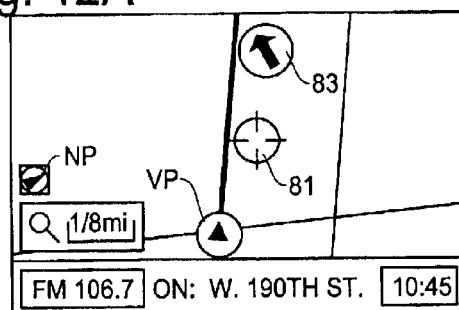
FIGS. 12A and 12B are schematic diagrams of the navigation screen showing map scroll operations where the map is scrolled from FIG. 12B to FIG. 12A by the up key after setting the scroll direction in FIG. 7F.
Figure 13A:
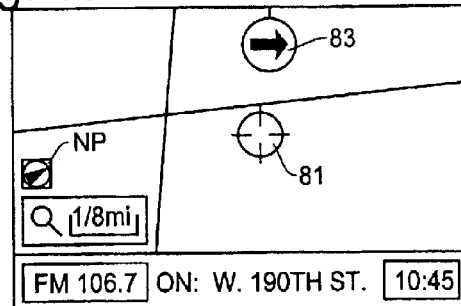
FIGS. 13A and 13B are schematic diagrams of the navigation screen showing map scroll operations where the map is scrolled from FIG. 13B to FIG. 13A by the up key after setting the scroll direction in FIG. 7G.
Figure 12B:
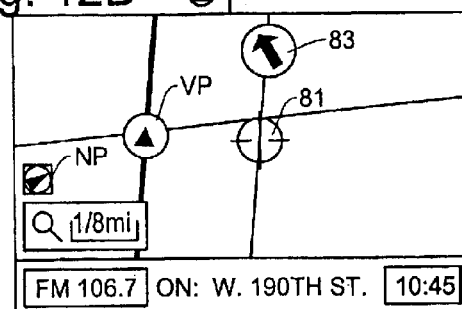
Figure 13B:
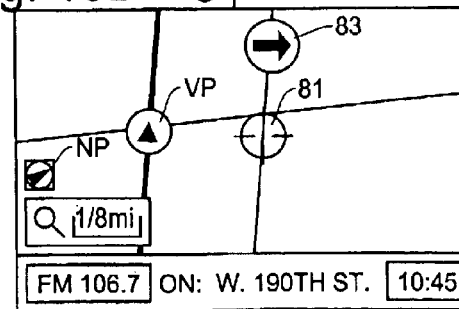

In the example of FIG. 7F, the map scroll direction is "upper left" as shown by the icon 83 which is produced by pressing the enter key in the condition of FIG. 7E. In this situation, if the user presses the up key, the map image on the screen is scrolled in the upper left direction as shown in FIGS. 12A and 12B. In the example of FIG. 7G, the map scroll direction is "right" as shown by the icon 83 which is produced by pressing the enter key for less than the predetermined time in the condition of FIG. 7F. In this situation, if the user presses the up key, the map image on the screen is scrolled in the right direction as shown in FIGS. 13A and 13B.

Figure 16A:
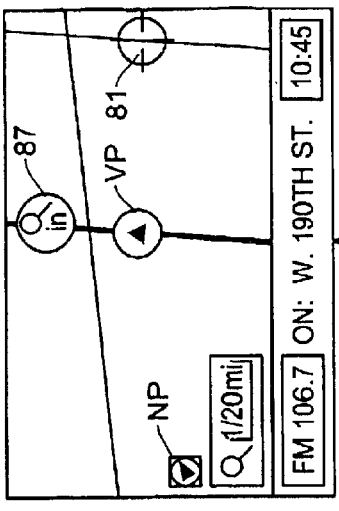
FIGS. 16A and 16B are schematic diagrams of the navigation screen showing map zoom operations where the map scale is changed from FIG. 16B to FIG. 16A by the up key after setting the zoom-in mode FIG. 7C.
Figure 16B:
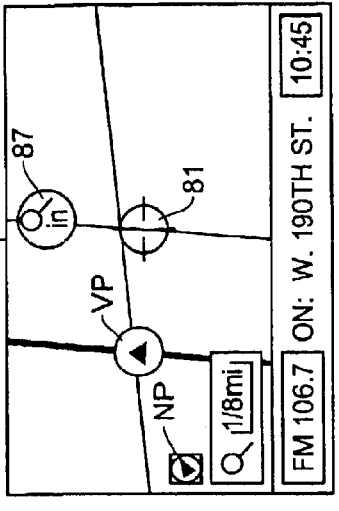
Figure 15A:
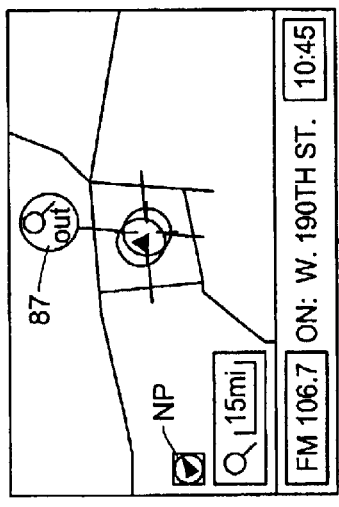
FIGS. 15A and 15B are schematic diagrams of the navigation screen showing map zoom operations where the map scale is changed from FIG. 15B to FIG. 15A by the up key after setting the zoom-out mode in FIG. 7B.
Figure 15B:
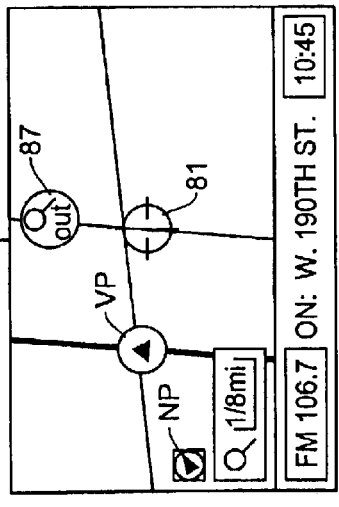

In the example of FIG. 7B, the navigation system screen is set to a zoom-out mode as shown by the icon 87 which is produced by pressing the enter key in the condition of FIG. 7A. In this situation, if the user presses the up key, the map image is zoomed-out so that the screen shows a wider area while small places may become invisible as shown in FIGS. 15A and 15B. In the example of FIG. 7C, the navigation system screen is set to a zoom-in mode as shown by the icon 87 which is produced by pressing the enter key in the condition of FIG. 7B. In this situation, if the user presses the up key, the map image is zoomed-in so that the screen shows a smaller area as shown in FIGS. 16A and 16B. Thus, the images of small places will be enlarged for achieving detailed views.

At anywhere in the situations of FIGS. 7A–7G, the navigation system returns to other functions such as a destination selection. For example, by pressing the enter key for more than three seconds (Cancel) or pressing the down key at the conditions of FIGS. 7A–7G, the navigation system screen is changed to FIG. 8B. In the example of FIG. 8B, a cursor 81 crosses a street which is typically specified by the user when scrolling the map in the process described in FIGS. 7A–7G (in this case, FIG. 7D). This condition can also be established by operating the up and down keys in a locator map screen in FIG. 8A.

Then, an address of the cursor point will be displayed by pressing the enter key for less than the predetermined time length as shown in FIG. 8C. In the screen of FIG. 8C, a balloon message shows the address of the cursor point. In the case where this address indicates the place where the user wants to go, the user presses the enter key to confirm the destination as shown in FIG. 8D. By pressing the enter key in FIG. 8D, the navigation system calculates the route to the destination and starts the route guidance. If the address is not the place that the user wants to go, the condition of FIG. 8C is canceled by pressing the enter key for more than the predetermined time length (ex. three seconds) to return to the screen of FIG. 8B.

By pressing the down key in the condition of FIG. 8B, the navigation system provides the selection modes for selecting the map scroll directions and map zoom in/out as shown in FIGS. 9A–9G. The display examples of FIGS. 9A–9G are sequentially changed by pressing the enter key, which correspond to the group of icons shown in the lower part of FIG. 6B. Namely, in the case where the user wants to scroll the map generally in down directions, the user first presses the down key (down button) in FIG. 8B. Then the navigation system shows different icons (scroll directions and zoom in/out) in a sequential order every time when the enter key is pressed as shown in FIGS. 9A–9G.

Figure 9A:
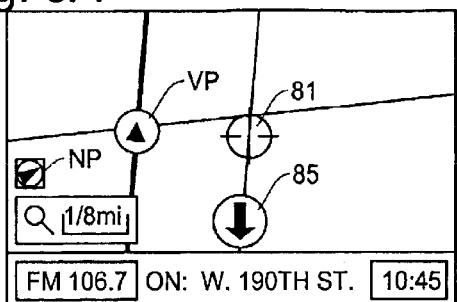
FIGS. 9A–9G are schematic diagrams showing examples of navigation screen where map scroll directions or map zoom in/out are specified in response to an operation of an enter key when a down key is pressed in advance.
Figure 9G:
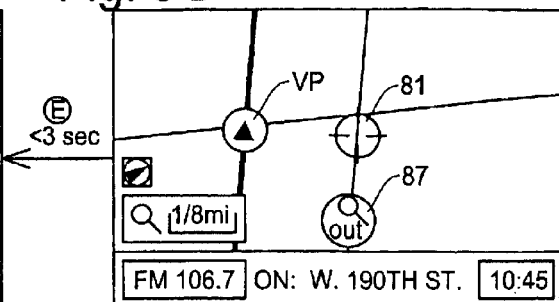
Figure 17A:
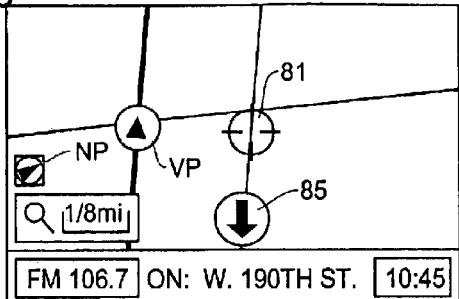
FIGS. 17A and 17B are schematic diagrams of the navigation screen showing map scroll operations where the map is scrolled from FIG. 17A to FIG. 17B by the down key after setting the scroll direction in FIG. 9A.
Figure 17B:
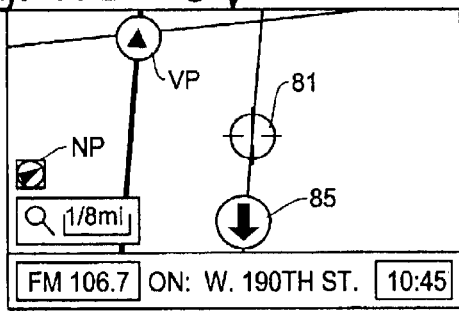

For example, in FIG. 9G, the navigation system is in the zoom-out mode as shown by the icon 87. By pressing the enter key for less than the predetermined time length such as three seconds, the screen is changed to FIG. 9A where the map scroll direction becomes "down" as shown by the icon 85. In this situation, if the user presses the down key again, the map image on the screen is scrolled downward as shown in FIGS. 17A and 17B.

Figure 9B:
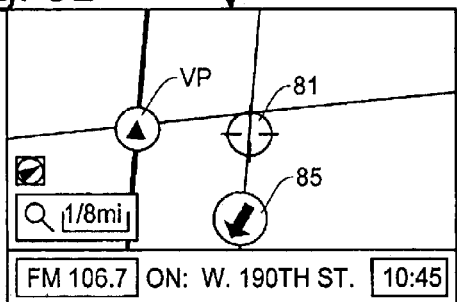
Figure 18A:
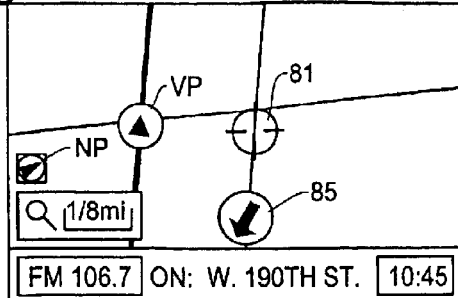
FIGS. 18A and 18B are schematic diagrams of the navigation screen showing map scroll operations where the map is scrolled from FIG. 18A to FIG. 18B by the down key after setting the scroll direction in FIG. 9B.
Figure 18B:
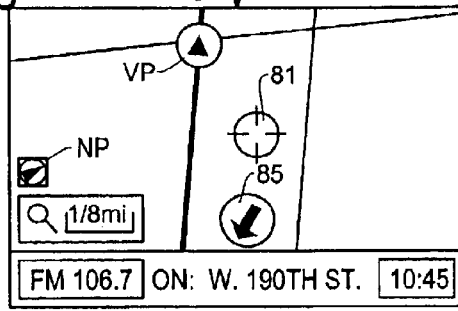
Figure 19A:
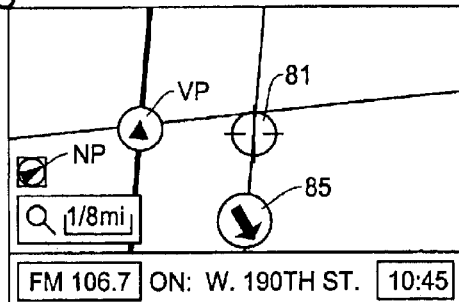
FIGS. 19A and 19B are schematic diagrams of the navigation screen showing map scroll operations where the map is scrolled from FIG. 19A to FIG. 19B by the down key after setting the scroll direction in FIG. 9C.
Figure 19B:
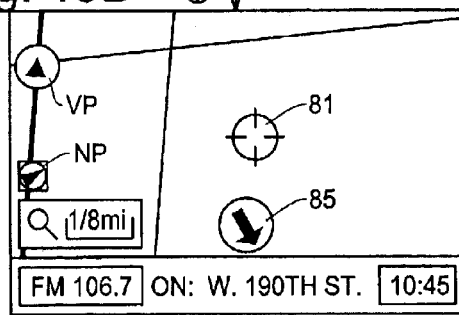

In the example of FIG. 9B, the map scroll direction is "lower left" as shown by the icon 85 which is produced by pressing the enter key in the condition of FIG. 9A. In this situation, if the user presses the down key, the map image on the screen is scrolled in the lower left direction as shown in FIGS. 18A and 18B. In the example of FIG. 9C, the map scroll direction is "lower right" as shown by the icon 85 which is produced by pressing the enter key for less than the predetermined time in the condition of FIG. 9B. In this situation, if the user presses the down key, the map image on the screen is scrolled in the lower right direction as shown in FIGS. 19A and 19B.

Figure 9F:
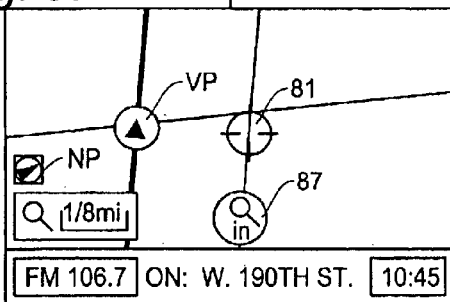
Figure 9C:
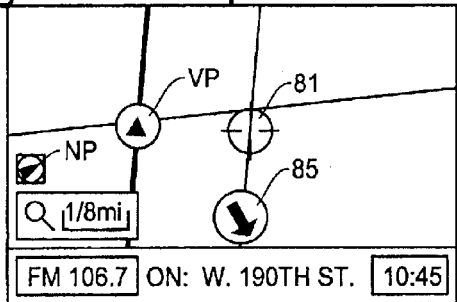
Figure 9E:
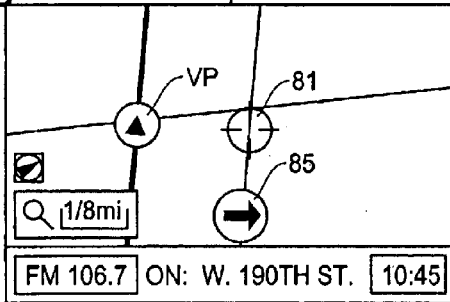
Figure 9D:
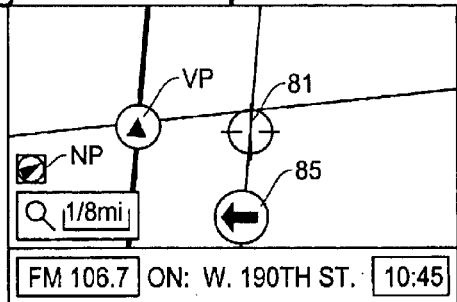
Figure 20A:
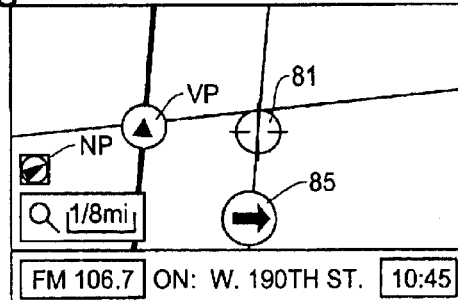
FIGS. 20A and 20B are schematic diagrams of the navigation screen showing map scroll operations where the map is scrolled from FIG. 20A to FIG. 20B by the down key after setting the scroll direction in FIG. 9E.
Figure 20B:
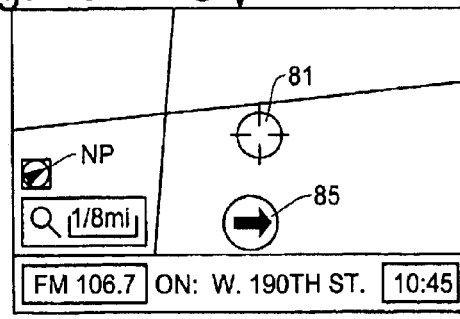
Figure 21A:
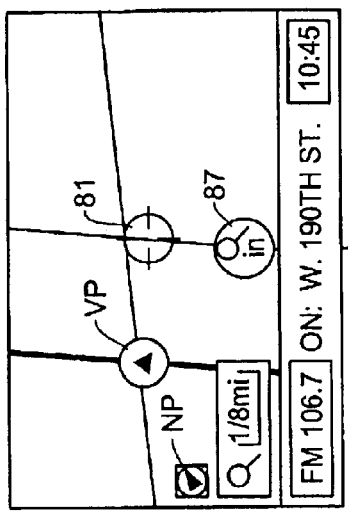
FIGS. 21A and 21B are schematic diagrams of the navigation screen showing map scroll operations where the map is scrolled from FIG. 21A to FIG. 21B by the down key after setting the scroll direction in FIG. 9D.
Figure 21B:
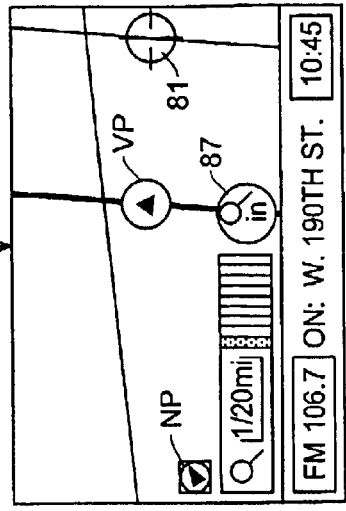

In the example of FIG. 9D, the map scroll direction is "left" as shown by the icon 85 which is produced by pressing the enter key in the condition of FIG. 9C. In this situation, if the user presses the down key, the map image on the screen is scrolled in the left direction as shown in FIGS. 21A and 21B. In the example of FIG. 9E, the map scroll direction is "right" as shown by the icon 85 which is produced by pressing the enter key for less than the predetermined time in the condition of FIG. 9D. In this situation, if the user presses the down key, the map image on the screen is scrolled in the right direction as shown in FIGS. 20A and 20B.

Figure 22A:
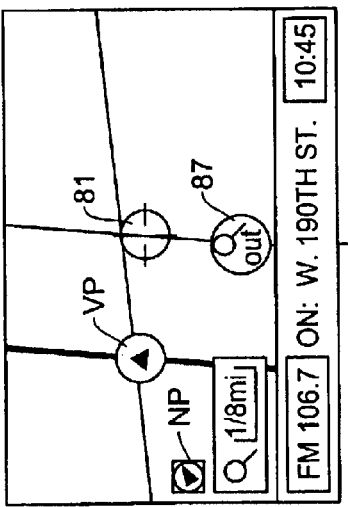
FIGS. 22A and 22B are schematic diagrams of the navigation screen showing map zoom operations where the map scale is changed from FIG. 22A to FIG. 22B by the down key after setting the zoom-out mode in FIG. 9G.
Figure 22B:
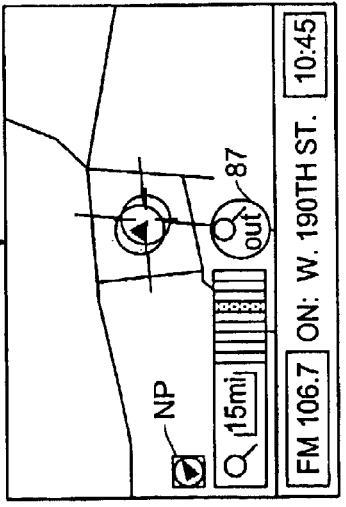
Figure 23A:
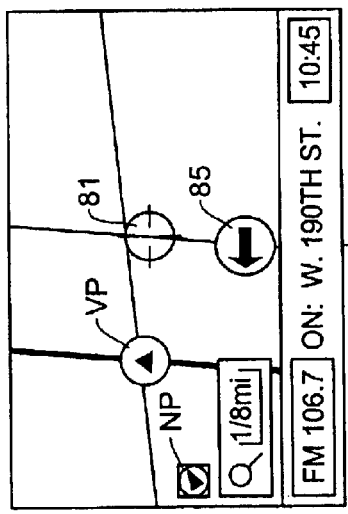
FIGS. 23A and 23B are schematic diagrams of the navigation screen showing map zoom operations where the map scale is changed from FIG. 23A to FIG. 23B by the down key after setting the zoom-in mode in FIG. 9F.
Figure 23B:
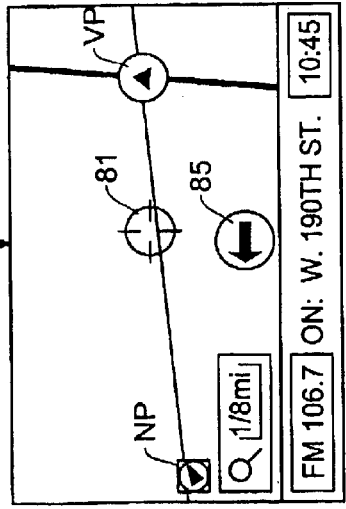

In the example of FIG. 9F, the navigation system screen is set to a zoom-in mode as shown by the icon 87 which is produced by pressing the enter key in the condition of FIG. 9E. In this situation, if the user presses the down key, the map image is zoomed-in so that the screen shows a smaller area with enlarged view as shown in FIGS. 23A and 23B. In the example of FIG. 9G, the navigation system screen is set to a zoom-out mode as shown by the icon 87 which is produced by pressing the enter key in the condition of FIG. 9F. In this situation, if the user presses the down key, the map image is zoomed-out so that the screen shows a wider area as shown in FIGS. 22A and 22B. Thus, the images of small places may become invisible for covering the larger area in one view.

At anywhere in the situations of FIGS. 9A–9G, the navigation system returns to the functions shown in FIGS. 8A–8D. For example, by pressing the enter key for more than the predetermined time length (Cancel) or pressing the up key in FIGS. 9A–9G (in this example, FIG. 9A), the navigation system screen is changed to FIG. 8B. Thus, the address at the cursor point can be displayed as shown in FIG. 8C and the route to the destination can be confirmed as shown in FIG. 8D.

FIGS. 10A–16B show display examples of the map scroll and zoom in/out modes when using the up key in the present invention. As described in the foregoing with reference to FIGS. 7A–7G, when pressing the up key in the locator map screen of FIG. 8B, the navigation system displays the map scroll icon or zoom in/out icon every time when the user presses the enter key. In this mode, the navigation system sequentially changes the map scroll direction or map zoom in/out mode within the icon group shown in the upper part of FIG. 6B. Once the desired icon is displayed, the user further presses the up key to scroll the map in the selected direction or to set the map scale in the zoom-in/out mode.

The example of FIGS. 10A and 10B corresponds to FIG. 7D where the map scroll direction is selected to be "upward" as shown by the icon 83. Thus, by pressing the up key in FIG. 10B, the map image is scrolled in the upward direction as shown in FIG. 10A. Throughout the examples in this invention, the amount of scroll/zoom is controlled by the time length of pressing the up/down key. Thus, the scrolling/zoom stops when the user releases the up/down key as indicated by the star marks in FIGS. 10A–16B.

The example of FIGS. 11A and 11B corresponds to FIG. 7E where the map scroll direction is selected to be "upper right" as shown by the icon 83. Thus, by pressing the up key in FIG. 11B, the map image is scrolled in the upper right direction as shown in FIG. 11A. The example of FIGS. 12A and 12B corresponds to FIG. 7F where the map scroll direction is selected to be "upper left" as shown by the icon 83. Thus, by pressing the up key in FIG. 12B, the map image is scrolled in the upper left direction as shown in FIG. 12A.

The example of FIGS. 13A and 13B corresponds to FIG. 7G where the map scroll direction is selected to be "right" as shown by the icon 83. Thus, by pressing the up key in FIG. 13B, the map image is scrolled in the right direction as shown in FIG. 13A. The example of FIGS. 14A and 14B corresponds to FIG. 7A where the map scroll direction is selected to be "left" as shown by the icon 83. Thus, by pressing the up key in FIG. 14B, the map image is scrolled in the left direction as shown in FIG. 14A.

The example of FIGS. 15A and 15B corresponds to FIG. 7B where the map zoom-out mode is selected as shown by the icon 87. By pressing the up key in FIG. 15B, the map scale is changed so that the map image is zoomed-out to show a wider area as shown in FIG. 15A. Thus, the images of small places may become invisible for covering the larger area in one view. The example of FIGS. 16A and 16B corresponds to FIG. 7C where the map zoom-in mode is selected as shown by the icon 87. By pressing the up key in FIG. 16B, the map scale is changed so that the map image is zoomed-in to show a smaller area with an enlarged and detailed view as shown in FIG. 16A.

FIGS. 17A–23B show display examples of the map scroll and zoom in/out modes when using the down key in the present invention. As described in the foregoing with reference to FIGS. 9A–9G, when pressing the down key in the locator map screen of FIG. 8B, the navigation system displays the map scroll icon or zoom in/out icon every time when the user presses the enter key. In this mode, the navigation system sequentially changes the map scroll direction or map zoom in/out mode within the icon group shown in the lower part of FIG. 6B. Once the desired icon is displayed, the user further presses the down key to scroll the map in the selected direction or to set the map scale in the zoom-in/out mode.

The example of FIGS. 17A and 17B corresponds to FIG. 9A where the map scroll direction is selected to be "downward" as shown by the icon 85. Thus, by pressing the down key in FIG. 17A, the map image is scrolled in the downward direction as shown in FIG. 17B. As noted above, throughout the examples in the present invention, the amount of scroll/zoom is controlled by the time length of pressing the up/down key. Thus, the scrolling/zoom stops when the user releases the up/down key as indicated by the star marks in FIGS. 17A–23B.

The example of FIGS. 18A and 18B corresponds to FIG. 9B where the map scroll direction is selected to be "lower left" as shown by the icon 85. Thus, by pressing the down key in FIG. 18A, the map image is scrolled in the lower left direction as shown in FIG. 18B. The example of FIGS. 19A and 19B corresponds to FIG. 9C where the map scroll direction is selected to be "lower right" as shown by the icon 85. Thus, by pressing the down key in FIG. 19A, the map image is scrolled in the lower right direction as shown in FIG. 19B.

The example of FIGS. 20A and 20B corresponds to FIG. 9E where the map scroll direction is selected to be "right" as shown by the icon 85. Thus, by pressing the down key in FIG. 20A, the map image is scrolled in the right direction as shown in FIG. 20B. The example of FIGS. 21A and 21B corresponds to FIG. 9D where the map scroll direction is selected to be "left" as shown by the icon 85. Thus, by pressing the down key in FIG. 21A, the map image is scrolled in the left direction as shown in FIG. 21B.

The example of FIGS. 22A and 22B corresponds to FIG. 9G where the map zoom-out mode is selected as shown by the icon 87. By pressing the down key in FIG. 22A, the map scale is changed so that the map image is zoomed-out to show a wider area as shown in 22B. Thus, the images of small places may become invisible for covering the larger area in one view. The example of FIGS. 23A and 23B corresponds to FIG. 9F where the map zoom-in mode is selected as shown by the icon 87. By pressing the down key in FIG. 23A, the map scale is changed so that the map image is zoomed-in to show a smaller area with an enlarged and detailed view as shown in 23B.

Figure 24:
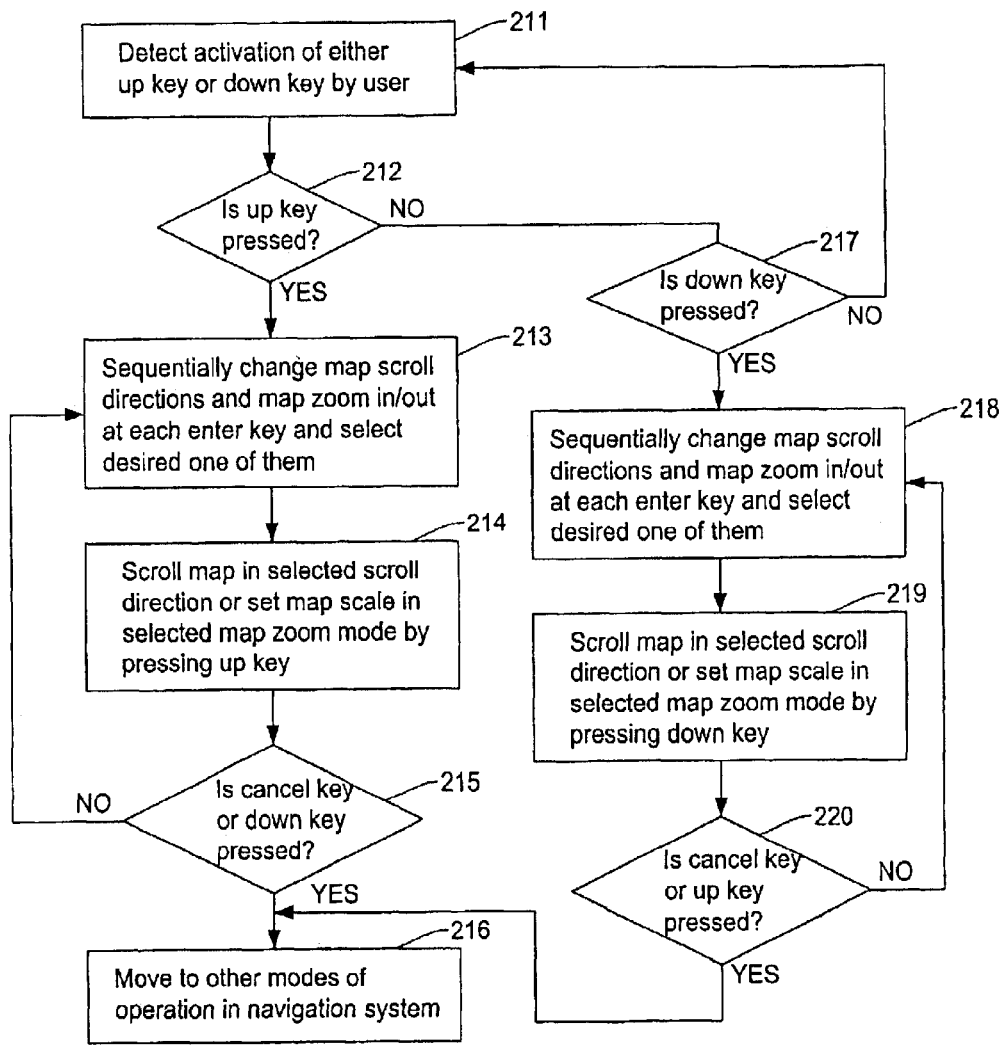
FIG. 24 is a flow chart showing an example of operation for controlling the map scroll function and map zoom function by the key arrangement of the present invention.

An example of process for controlling the map scroll function and map zoom function by the key arrangement of the present invention is shown in the flow chart of FIG. 24. This example shows the process where the user moves to the map scroll mode or map zoom mode from the other modes of operation of the navigation system, selects one of the map scroll direction or map zoom in/out, and scroll the map or change the scale of the map. This process further includes a step to go back to the other modes of operation of the navigation system.

In FIG. 24, the navigation system detects whether the user pushes either the up key or down key in the key arrangement such as three button device of the present invention (step 211). When the up key or down key is pressed, the navigation system determines whether the key pushed by the user is the up key (step 212). If the up key was activated, the navigation system sequentially changes the map scroll direction and map zoom in/out modes every when the user presses the enter key (step 213). One of the icons in the upper part of FIG. 6B is displayed at each screen to indicate the scroll direction or map zoom in/out mode. As noted above, the enter key is distinguished from the cancel key by the time length which is shorter than the predetermined time, such as three seconds.

The user scrolls the map in the selected scroll directions or sets the map scale in the selected map zoom-in mode or map zoom-out mode (step 214) by pressing the up key. As an example, the time length of pushing the up key determines the degrees of map scroll or map scale. The navigation system determines whether the cancel key (when the enter key is pressed for longer than the predetermined time length) or down key is pressed by the user (step 215). If either one of the keys is used, the navigation system goes back to the other modes of operation (step 216).

In the above step 212, if the key pressed by the user is not the up key, the navigation system determines whether the key pushed by the user is the down key (step 217). If the down key was activated, the navigation system sequentially changes the map scroll direction and map zoom in/out modes every time when the user presses the enter key (step 218). One of the icons in the lower part of FIG. 6B is displayed at each screen to indicate the scroll direction or map zoom in/out mode.

The user scrolls the map in the selected scroll directions or sets the map scale in the selected map zoom-in mode or map zoom-out mode (step 219) by pressing the down key. As an example, the time length of pushing the down key determines the degrees of map scroll or map scale. The navigation system determines whether the cancel key or up key is pressed by the user (step 220). If either one of the keys is used, the navigation system goes back to the other modes of operation (step 216).

As has been described above, according to the present invention, the unique key arrangement has the minimum number of keys for operating the navigation system, thereby simplifying the overall operation procedure of the navigation system. Thus, the user needs to use only such a small number of keys for the map scrolling and map zooming. Especially, when the navigation system is used in a vehicle, the key arrangement of the present invention is advantageous since the key arrangement can be mounted on the steering wheel so that the position of the Keys is close enough to the user. Thus, the user can operate the navigation system while holding steering wheel, thereby promoting safe driving.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A navigation system for guiding a user to a destination, comprising:
   a key arrangement which performs an enter key function, a cancel key function, and an up/down key function, said key arrangement being configured by three buttons located close to one another, one of the buttons of said key arrangement changing a current status of the navigation system to one of a map scroll mode and a map zoom mode and other buttons either scrolling a map image in a selected direction or setting a zoom scale of the map image;
   wherein said key arrangement of said navigation system is mounted on a steering wheel of a vehicle or a panel of a portable navigation system.

2. A navigation system as defined in claim 1, wherein, in said key arrangement configured by said three buttons, a first button functions as an up key, a second button functions as an enter key, and a third button functions as a down key, wherein the second button is located between the first and third buttons.

3. A navigation system as defined in claim 2, wherein said enter key performs to cancel the current status of the navigation system when pressed for a time longer than a predetermined time length.

4. A navigation system as defined in claim 2, wherein said current status of the navigation system is changed to the map scroll or map zoom mode when the up key or down key is pressed, and map scroll directions and map zoom-in and zoom-out mode are sequentially changed at each activation of the enter key for selecting one of the map scroll directions or the map zoom-in or zoom-out mode.

5. A navigation system as defined in claim 4, wherein when said current status of the navigation system is changed to the map scroll mode by pressing the up key, said map scroll directions in a group of generally upper directions of a map image are sequentially changed and selected at each activation of the enter key.

6. A navigation system as defined in claim 4, wherein when said current status of the navigation system is changed to the map scroll mode by pressing the down key, said map scroll directions in a group of generally lower directions of a map image are sequentially changed and selected at each activation of the enter key.

7. A navigation system as defined in claim 4, wherein an icon indicating the map scroll direction is changed sequentially when the map scroll direction is changed at each activation of the enter key.

8. A navigation system as defined in claim 4, wherein an icon indicating the map zoom-in mode or map zoom-out mode is changed sequentially when the map scroll direction and the map zoom mode are changed at each activation of the enter key.

9. A navigation system as defined in claim 5, wherein an amount of map scroll in the selected map scroll direction or an amount of zoom scale in the map zoom mode is controlled by a time length of pressing the up key.

10. A navigation system as defined in claim 6, wherein an amount of map scroll in the selected map scroll direction or an amount of zoom scale in the map zoom mode is controlled by a time length of pressing the down key.

11. A navigation system as defined in claim 1, wherein said three buttons are aligned on a straight line in a vertical, horizontal or diagonal direction.

12. A navigation system as defined in claim 1, wherein said three buttons are aligned in a triangle manner or a reverse triangle manner.

13. A navigation method, comprising the following steps of:
 changing a current status of the navigation system to a map scroll mode or a map zoom mode by pressing either an up key or a down key;
 changing and selecting a map scroll direction or a map zoom-in or zoom-out mode sequentially on a screen of the navigation system by pressing an enter key;
 adjusting an amount of map scroll in the selected map scroll direction or a map zoom scale in the selected map zoom-in or zoom-out mode by pressing either the up key or the down key; and
 returning to an operation mode of the navigation system other than said map scroll mode or said map zoom mode by pressing a predetermined key.

14. A navigation method as defined in claim 13, wherein said up key, down key and enter key are arranged in a close proximity with one another and mounted on a steering wheel of a vehicle or a panel of a portable navigation system, wherein the enter key is located between the up key and the down key.

15. A navigation method as defined in claim 13, wherein said enter key performs to cancel the current status of the navigation system when pressed for a time longer than a predetermined time length.

16. A navigation method as defined in claim 13, wherein said step of changing the current status of the navigation system includes a step of detecting which one of the up key or down key is used, and when the up key is used, in said changing and selecting step, said map scroll directions in a group of generally upper directions on a map image are sequentially changed and selected at each activation of the enter key.

17. A navigation method as defined in claim 13, wherein said step of changing the current status of the navigation system includes a step of detecting which one of the up key or down key is used, and when the down key is used, in said changing and selecting step, said map scroll directions in a group of generally lower directions of a map image are sequentially changed and selected at each activation of the enter key.

18. A navigation method as defined in claim 13, wherein said step of changing and selecting the map scroll direction or the map zoom-in or zoom-out mode includes a step of sequentially displaying an icon on the screen of the navigation system for indicating the map scroll direction or the map zoom-in mode or map zoom-out mode at each activation of the enter key.

19. A navigation method as defined in claim 13, wherein said step of adjusting the amount of map scroll in the selected map scroll direction or the map zoom scale in the selected map zoom-in or zoom-out mode includes a step of determining the amount of map scroll or the amount of zoom scale based on a time length of pressing the up key or the down key.

20. A navigation method as defined in claim 13, wherein said step of returning to the operation mode of the navigation system other than said map scroll mode or said map zoom mode includes a step of detecting an activation of a cancel key where said enter key performs as said cancel key when pressed for longer than a predetermined time length.

* * * * *